United States Patent
Song et al.

(10) Patent No.: US 11,753,805 B2
(45) Date of Patent: Sep. 12, 2023

(54) USER INTERFACE FOR CONTROLLING A SHOWER SYSTEM

(71) Applicant: AS America, Inc., Piscataway, NJ (US)

(72) Inventors: Ki Bok Song, Plainview, NY (US); Jean-Jacques L'Henaff, New Canaan, CT (US); Greg Reinecker, Brooklyn, NY (US)

(73) Assignee: AS America, Inc., Piscataway, NJ (US)

( * ) Notice: Subject to any disclaimer, the term of this patent is extended or adjusted under 35 U.S.C. 154(b) by 550 days.

(21) Appl. No.: 16/756,036

(22) PCT Filed: Oct. 17, 2018

(86) PCT No.: PCT/US2018/056215
§ 371 (c)(1),
(2) Date: Apr. 14, 2020

(87) PCT Pub. No.: WO2019/079393
PCT Pub. Date: Apr. 25, 2019

(65) Prior Publication Data
US 2020/0263400 A1    Aug. 20, 2020

Related U.S. Application Data

(60) Provisional application No. 62/573,575, filed on Oct. 17, 2017.

(51) Int. Cl.
*E03C 1/05* (2006.01)
*G05D 23/13* (2006.01)
(Continued)

(52) U.S. Cl.
CPC ......... *E03C 1/055* (2013.01); *G05D 23/1393* (2013.01); *G06F 3/04847* (2013.01); *F24D 17/0078* (2013.01)

(58) Field of Classification Search
CPC .................. E03C 1/055; E03C 2001/0418
See application file for complete search history.

(56) References Cited

U.S. PATENT DOCUMENTS 6,879,863 B2 *  4/2005  Mueller ................ H03K 17/97
                                                116/306
7,889,187 B2 *  2/2011  Freier ................... G06F 3/0482
                                                345/184

(Continued)

OTHER PUBLICATIONS

International Search Report dated Apr. 2, 2019 in corresponding International Application No. PCT/US2018/056215 (2 pages).

*Primary Examiner* — Reinaldo Sanchez-Medina
(74) *Attorney, Agent, or Firm* — Tyler A. Stevenson; Anna-lisa L. Gallo

(57) ABSTRACT

A user interface (120) for controlling a shower system (100) includes at least one control (140) configured to be actuated by a user and generate one or more signals for controlling an operation of the shower system (100), and at least one indicator light (154) configured to illuminate in different patterns which are matched to different operational stages of the shower system (100). The at least one indicator light (154) may be configured to provide a first light pattern when the shower system (100) is in a first operational stage, and a second light pattern that is different from the first light pattern when the shower system (100) is in a second operational stage. The first operational stage may include when water in the shower system (100) is being warmed to a predetermined temperature, and the second operational stage may include when a temperature of the water has reached the predetermined temperature.

16 Claims, 11 Drawing Sheets

(51) Int. Cl.
*G06F 3/04847* (2022.01)
*F24D 17/00* (2022.01)

(56) References Cited

U.S. PATENT DOCUMENTS

| | | | |
|---|---|---|---|
| 9,228,330 B1* | 1/2016 | Brown | G01K 1/02 |
| 2003/0125842 A1 | 7/2003 | Chang | |
| 2008/0000997 A1* | 1/2008 | Smith | E03C 1/055 |
| | | | 29/729 |
| 2008/0112843 A1 | 5/2008 | Peel | |
| 2008/0259056 A1 | 10/2008 | Freier | |
| 2009/0119832 A1* | 5/2009 | Conroy | E03C 1/05 |
| | | | 251/129.01 |
| 2011/0186138 A1* | 8/2011 | Hanna | E03C 1/05 |
| | | | 137/1 |
| 2015/0221206 A1* | 8/2015 | Schneider, II | E03C 1/0404 |
| | | | 340/584 |
| 2017/0138020 A1 | 5/2017 | Chicurel | |
| 2018/0193852 A1* | 7/2018 | L'Henaff | G08C 17/02 |
| 2018/0340624 A1* | 11/2018 | Wang | F16K 31/041 |
| 2019/0024350 A1* | 1/2019 | Silverstein | G01S 13/88 |

* cited by examiner

USER INTERFACE FOR CONTROLLING A SHOWER SYSTEM

CROSS-REFERENCE TO RELATED APPLICATIONS

This application claims the benefit of U.S. Provisional Patent Application No. 62/573,575, filed Oct. 17, 2017, which is incorporated herein by reference in its entirety.

FIELD OF THE INVENTION

The present invention, according to some embodiments, relates to a recirculating shower system. In further embodiments, the present invention provides a user interface for controlling a shower system.

BACKGROUND OF THE INVENTION

Domestic shower systems typically include separate hot and cold water supplies which combine at a mixing valve that is controlled by a user. When the mixing valve is opened, hot and cold water from the separate supplies are mixed and then outputted by the shower system through a showerhead, faucet, or other plumbing fixture. The mixing valve may be operated by the user to adjust the ratio of the hot and cold water in order to control the temperature of the water that is outputted by the shower system. A user will often wait for the desired water temperature to be reached before entering and using the shower.

There may be a significant lag time between the opening of the mixing valve and when the desired temperature of the outputted water is reached. This may be caused, for example, when there is a large distance between the water heater which supplies the hot water and the mixing valve of the shower. Water that has been sitting in the hot water supply line may be initially cold when the mixing valve is open, resulting in a delay in obtaining the desired temperature for showering. During this lag time water may be allowed to continuously run in the shower while not in use by the user. Moreover, water may be allowed to continuously run in the shower as the user adjusts the mixing valve to reach the desired temperature. For example, a user may repeatedly feel the water being outputted by the shower system and adjust the mixing valve accordingly until the desired temperature is reached. In some cases, a user may further leave the water running for a substantial period of time before entering the shower even after the desired temperature has been reached.

A substantial amount of water may be wasted as a result of the lag time between opening of the mixing valve and use of the shower by the user. For example, if a shower system is designed to output water at a rate of 2.5 gallons per minute (gpm), a two-minute delay while the desired temperature of the water is reached can result in 5 gallons of water that is essentially wasted. Further delay by the user after the water has reached the desired temperature will result in additional wasted water.

SUMMARY OF THE INVENTION

The present invention, according to certain aspects, provides a shower system that is configured to reduce the amount of water that may be wasted. In some embodiments, the present invention provides a recirculating shower system which is configured to mix hot and cold water to obtain a desired water temperature before outputting the water to the user. In further embodiments, the present invention provides a simple, intuitive digital user interface that may be configured to control a shower system, such as a recirculating shower system. In some embodiments, the user interface includes one or more visual and/or audio indicators that are matched to the water movement through the shower system.

A shower system according to some embodiments includes a recirculation system having a first inlet for receiving water from a first water supply (e.g., hot water supply), a second inlet for receiving water from a second water supply (e.g., cold water supply), and a mixing valve configured to mix water received from the first water supply and the second water supply to produce a mixed water stream. A first outlet of the recirculation system is configured to communicate the mixed water stream from the mixing valve to a first delivery fixture (e.g., a handheld showerhead). In some embodiments, the recirculation system further includes a first shutoff valve having an open configuration and a closed configuration, the mixed water stream being allowed to flow from the mixing valve to the first outlet when the first shutoff valve is in the open configuration and prevented from flowing from the mixing valve to the first outlet when the first shutoff valve is in the closed configuration. A controller may be provided which is configured to transition the first shutoff valve between the open configuration and the closed configuration. In particular, the controller may be configured to maintain the first shutoff valve in the closed configuration while a sensed water temperature within the recirculation system is lower than a predetermined temperature. In some embodiments, the shower system further includes a user interface in communication with the recirculation system and configured to receive one or more inputs from a user for controlling the recirculation system. The user interface may communicate with the recirculation system via a wired connection, in some embodiments, or wirelessly according to other embodiments. In some embodiments, the user interface includes at least a temperature control actuatable by the user to set the predetermined temperature. In further embodiments, the user interface includes one or more indicators which are configured to exhibit different behaviors that are matched to different statuses of the shower system. In some embodiments, the recirculation system also includes a recirculating pump configured to pump water received from the first inlet to the second inlet until the sensed water temperature within the recirculation system reaches the predetermined temperature. The controller may be configured to deactivate the recirculation pump when the sensed water temperature within the recirculation system is at the predetermined temperature according to some embodiments.

In some embodiments, the recirculation system further includes a second outlet for delivering the mixed water stream from the mixing valve to a second delivery fixture (e.g., a fixed showerhead). A second shutoff valve may be provided having an open configuration and a closed configuration, the mixed water stream being allowed to flow from the mixing valve to the second outlet when the second shutoff valve is in the open configuration and prevented from flowing from the mixing valve to the second outlet when the second shutoff valve is in the closed configuration. In some embodiments, the controller of the recirculation system is configured to transition the second shutoff valve between the open configuration and the closed configuration, and may be configured to maintain the second shutoff valve in the closed configuration while the sensed water temperature within the recirculation system is lower than the predetermined temperature.

In some embodiments, the recirculation system includes a housing configured to contain at least the controller of the recirculation system. In some embodiments, the housing contains at least the controller, mixing valve, first and second shutoff valves, and recirculation pump of the recirculation system. The controller of the recirculation system may be electrically connected to the user interface by one or more power and/or data transmission cables. In some embodiments, the housing includes one or more electrical ports for receiving the one or more power and/or data transmission cables. The one or more power and/or data transmission cables may be configured to transmit signals between the controller and the user interface. In some embodiments, the controller may be configured to transmit and/or receive signals to and from the user interface wirelessly (e.g., via WI-FI, Bluetooth, etc.). In some embodiments, the user interface may include a separate power source (e.g., battery). In some such embodiments, a physical cable for transmitting power and/or data between the controller and the user interface may be omitted.

In some embodiments, the user interface includes a backing plate, the temperature control being rotatable with respect to the backing plate to allow the user to set the predetermined temperature. In some embodiments, the temperature control is rotatable by the user in a first direction to increase the predetermined temperature and rotatable in a second opposite direction by the user to decrease the predetermined temperature. In some such embodiments, the temperature control is rotatable only through a predetermined angular range. In some embodiments, the backing plate further includes one or more indicia representative of relative temperature, and the temperature control includes a handle which overlays the one or more indicia.

In some embodiments, the user interface further includes a first fixture control and a second fixture control. In some such embodiments, actuation of the first fixture control when the sensed water temperature within the recirculation system is at least the predetermined temperature causes the controller to transition the first shutoff valve to the open configuration, and actuation of the second fixture control when the sensed water temperature within the recirculation system is at least the predetermined temperature causes the controller to transition the second shutoff valve to the open configuration. In some embodiments, the temperature control is actuatable by the user through a first motion, and the first fixture control and second fixture control are actuatable by the user through a second motion that is different than the first motion. For example, in some embodiments, the first motion is a rotational motion, and the second motion is a linear motion. In some embodiments, the user interface includes a central core, the temperature control comprises a ring positioned around and rotatable about the central core, and the first fixture control and the second fixture control each including a button on a face of the central core. In some embodiments, each of the first fixture control and the second fixture control may also include a graphical icon which is configured to illuminate, for example, upon actuation by the user or at other stages during the operation of the shower system.

In certain embodiments, the one or more status indicators are configured to provide a visual or audio signal that is indicative of a status of the shower system. In some embodiments, the one or more status indicators includes an indicator light which is configured to illuminate in different patterns and/or change colors depending on the status of the shower system. In some embodiments, the indicator light comprises a ring positioned along a periphery of the face of the central core. In some embodiments, the indicator light is configured to provide, for example, a rotating or swirling light pattern when water is being warmed to the desired water temperature (e.g., while the recirculation pump is activated). In some embodiments, indicator light is configured to repeatedly fade on and off, for example, when the water has reach the desired water temperature and is ready for use (e.g., while recirculation pump is deactivated) or when the shower system is in a paused condition such that water is not being delivered through either the first or second delivery fixtures. In some embodiments, the indicator light is configured to be constantly and solidly lit when, for example, water is being delivered through the one or more delivery fixtures (e.g., during showering). In further embodiments, the indicator light is configured to rapidly blink or flash when, for example, the shower system is about to turn off or an error condition has been reached.

The user interface may be configured to be mounted onto a wall, for example, a wall of a shower enclosure. In some embodiments, the shower system includes a mounting plate configured to be secured to the wall, and the user interface in turn is configured to be coupled to the mounting plate. In certain embodiments, the user interface is configured to be snap fit onto the mounting plate. In yet further embodiments, the user interface is configured to be uncoupled from the mounting plate by a separate tool which is insertable into a portion of the user interface.

In further embodiments, a user interface for controlling a shower system (e.g., a recirculating shower system) includes at least one indicator light configured to illuminate in different patterns which are matched to different operational stages of the shower system. In some embodiments, the user interface further includes at least one control configured to be actuated by a user and generate one or more signals for controlling an operation of the shower system. In some embodiments, the at least one indicator light is configured to provide a first light pattern when the shower system is in a first operational stage and a second light pattern that is different from the first light pattern when the shower system is in a second operational stage. The first operational stage may occur, for example, when water in the shower system is being warmed to a predetermined temperature, and the second operational stage may occur when a temperature of the water has reached the predetermined temperature. In some embodiments, the first light pattern may include a rotating or swirling light pattern, and the second light pattern includes a fading on and off pattern. In some embodiments, the indicator light is configured to provide a third light pattern that is different from the first light pattern and the second light pattern when the shower system is in a third operational stage, for example, when the water is flowing to a delivery fixture (e.g., a showerhead). The third light pattern may include a constant solid light in some embodiments.

In some embodiments, the at least one control of the user interface includes a temperature control to allow a user to set the predetermined temperature. In some embodiments, the user interface includes a central core, and the temperature control includes a ring positioned around and rotatable about the central core. In some embodiments, the temperature control further includes a handle projecting radially outward from the ring, wherein an angular position of the handle relative to the central core is indicative of the predetermined temperature. The at least one indicator light may be positioned on a face of the central core. For example, the at least one indicator light is shaped as a circle along a periphery of the face of the central core, which may be surrounded by the temperature control ring. In some embodiments, the at least one indicator light is further configured to change colors depending on a sensed water temperature of the shower system. For example, the indicator light may show a first color (e.g., white) when the water temperate is at the predetermined temperature, and a second color (e.g., blue) when the water temperature is below the predetermined temperature.

In further embodiments, the at least one control of the user interface includes a first fixture control configured to allow a user to activate a first delivery fixture of the shower system (e.g., showerhead). In some embodiments, the user interface includes a second fixture control configured to allow the user to activate a second delivery fixture of the shower system (e.g., handheld shower). In some embodiments, the first fixture control and the second fixture control are located on the central core of the user interface. In some embodiments, the first fixture control and the second fixture control are separate buttons on the user interface. In some embodiments, the first fixture control includes a first graphical icon configured to illuminate when the first delivery fixture is activated, and the second fixture control includes a second graphical icon configured to illuminate when the second delivery fixture is activated. The first and second graphical icons may be positioned on face of the central core of the user interface, and may be surrounded by the at least one indicator light.

In some embodiments, the central core of the user interface includes a back portion opposite the face. In some embodiments, the back portion includes one or more ports for receiving an electrical cable for communicating with a controller (e.g., a controller for a recirculating shower system) and transmitting the one or more signals to the controller. In other embodiments, the user interface may include one or more wireless communication modules configured to communicate with and transmit the one or more signals wirelessly (e.g., via WI-FI, Bluetooth, radio, etc.) to the controller that is remote from the user interface. The one or more signals may include, for example, a temperature control signal and/or a delivery fixture selection signal. In some embodiments, the user interface may include or be configured to house one or more batteries for supplying power to the user interface. The one or more batteries may be housed, for example, within the central core and may be accessible through the back portion.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention can be embodied in different forms and thus should not be construed as being limited to the embodiments set forth herein.

DETAILED DESCRIPTION

The present subject matter will now be described more fully hereinafter with reference to the accompanying Figures, in which representative embodiments are shown. The present subject matter can, however, be embodied in different forms and should not be construed as limited to the embodiments set forth herein. Rather, these embodiments are provided to describe and enable one of skill in the art.

Figure 1:
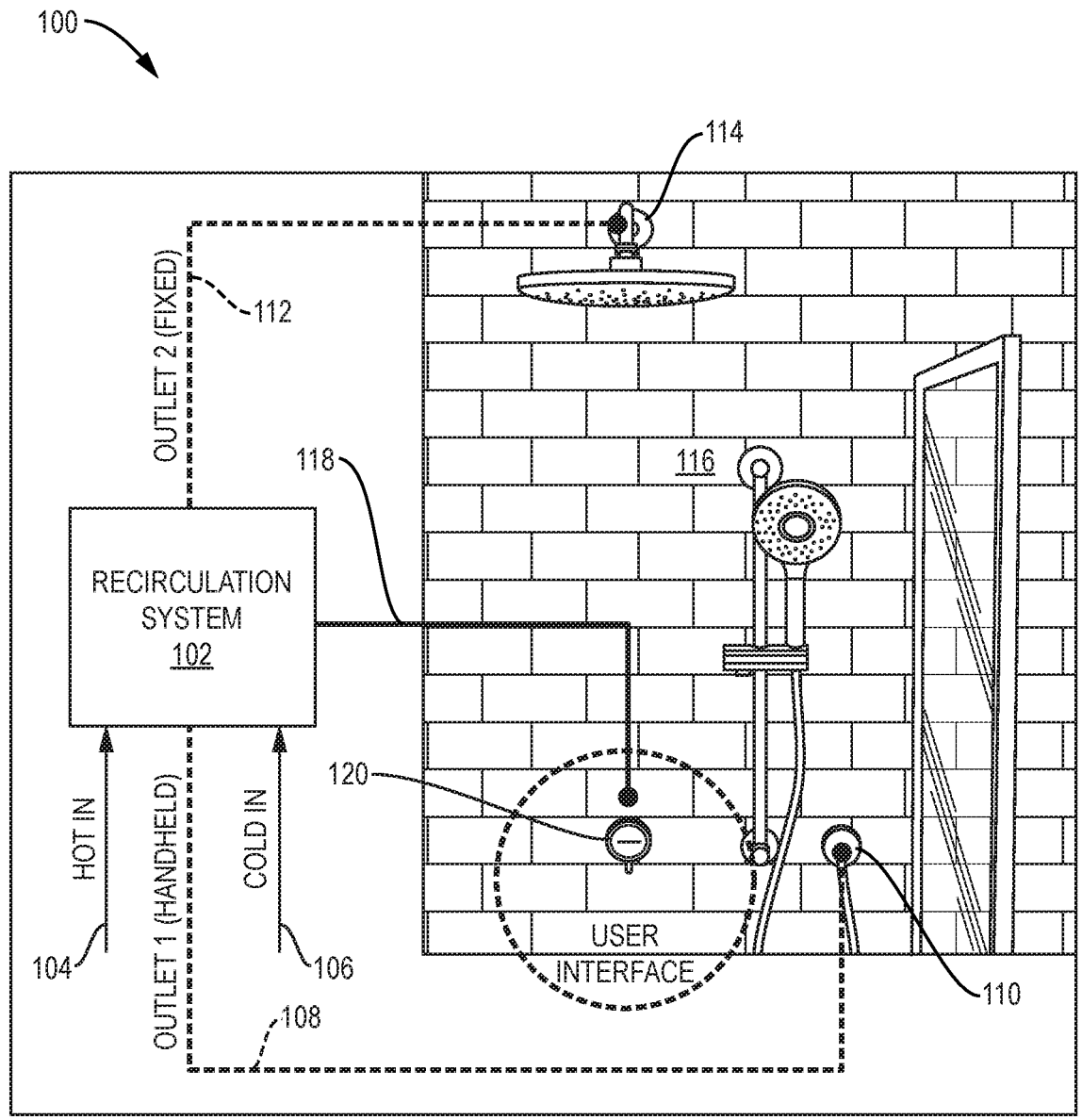
FIG. 1 illustrates an arrangement of a recirculating shower system according to an exemplary embodiment of the present invention.

Referring to the drawings in detail, wherein like reference numerals indicate like elements throughout, there is shown in FIG. 1 a shower system, generally designated 100, in accordance with an exemplary embodiment of the present invention. Shower system 100 may be, for example, a domestic shower system which is configured for residential home use or a commercial shower system. Moreover, shower system 100 may be installed as an open shower, in an enclosed or partially enclosed shower stall, as a combination with a bathtub, or any other suitable arrangement known in the art. Shower system 100, in certain embodiments, includes a recirculation system 102 having at least one inlet which is arranged to receive water from at least one water supply line, preferably at least two water supply lines, for example, a hot water supply line 104 and a cold water supply line 106. Recirculation system 102, in some embodiments, further includes one or more outlets 108, 112 which are configured to output water from the recirculation system 102 to one or more delivery fixtures in shower system 100 through suitable piping. In the illustrated embodiment, a first outlet 108 connects to a handheld showerhead 110 while a second outlet 112 connects to fixed showerhead 114. It will be appreciated that the present invention need not be limited to these particular fixtures and that the outlets of recirculation system 102 may be connected to other delivery fixtures in alternative embodiments (e.g., a faucet, tub spout, wall nozzles, sprayers, etc.). It should also be appreciated that while FIG. 1 shows two outlets, other embodiments of the present invention may include more than two outlets. In yet other embodiments, recirculation system 102 may have only one outlet. In certain embodiments, recirculation system 102 includes the same number of outlets as the number of delivery fixtures in shower system 100, with each delivery fixture being connected to a separate outlet of recirculation system 102.

As will be described further herein, recirculation system 102 may be particularly configured to allow the water received from the water supply lines 104, 106 to reach a desired temperature before outputting the water to the user through the one or more outlets 108, 112. In certain embodiments, use of recirculation system 102 in shower system 100 reduces the amount of water that may be otherwise wasted as a user awaits the water to reach a desired temperature before showering. In some embodiments, recirculation system 102 is configured to mix water from hot water supply line 104 and cold water supply line 106 prior to outputting the water through the one or more outlets 108, 112. In some embodiments, recirculation system 102 includes at least one temperature sensor to detect if the water has reached a desired temperature that may be selected by the user. In some embodiments, recirculation system 102 may be positioned behind a wall 116 of the shower enclosure such that, for example, the components of recirculation system 102 are separated from the shower enclosure by wall 116. According to some such embodiments, components of recirculation system 102 may be hidden from view by the user. In some embodiments, recirculation system 102 may be accessible from the shower enclosure, for example, via a door or hatch (not shown).

In further embodiments, recirculation system 102 is connected, via an electrical connection 118, to a user interface (or UI) 120 which is configured to allow a user to activate and control aspects of shower system 100. In some embodiments, recirculation system 102 may be connected wirelessly to user interface 120 (e.g., via WI-FI, Bluetooth, etc.), without the need for a physical electrical connection to user interface 120. User interface 120 is preferably located within the shower enclosure according to some embodiments such that a user may access user interface 120 while in the shower enclosure. In some such embodiments, user interface 120 is positioned on a surface of wall 116 that faces into the shower enclosure such that user interface 120 is physically accessible by a user in the shower enclosure. Electrical connection 118, when present, may extend through a hole or opening in wall 116 to recirculation system 102 in some such embodiments. In some embodiments, electrical connection 118 includes power and/or data transmission cables which connect user interface 120 with recirculation system 102. User interface 120, according to some embodiments, may receive user inputs which are converted to digital control signals that are then communicated, via electrical connection 118 or wirelessly, to a controller in recirculation system 102. In some embodiments, user interface 120 is configured to allow a user to adjust the desired temperature of the water to be outputted into the shower enclosure by recirculation system 102. In further embodiments, user interface 120 is configured to allow a user to divert water from one delivery fixture (e.g., handheld showerhead 110) to another delivery fixture (e.g., fixed showerhead 114). As will be described further herein, in some embodiments, user interface 120 is configured to receive inputs from a user through different motions or gestures. For example, a temperature selection may be received by user interface 120 by a first motion or user gesture (e.g., a rotational motion), while delivery fixture selection may be received by user interface 120 by a second motion or user gesture that is different from the first motion or user gesture (e.g., an axial motion). In certain embodiments, user interface 120 may also include one or more visual and/or audio indicators to indicate a status of shower system 100 to the user.

Figure 2A:
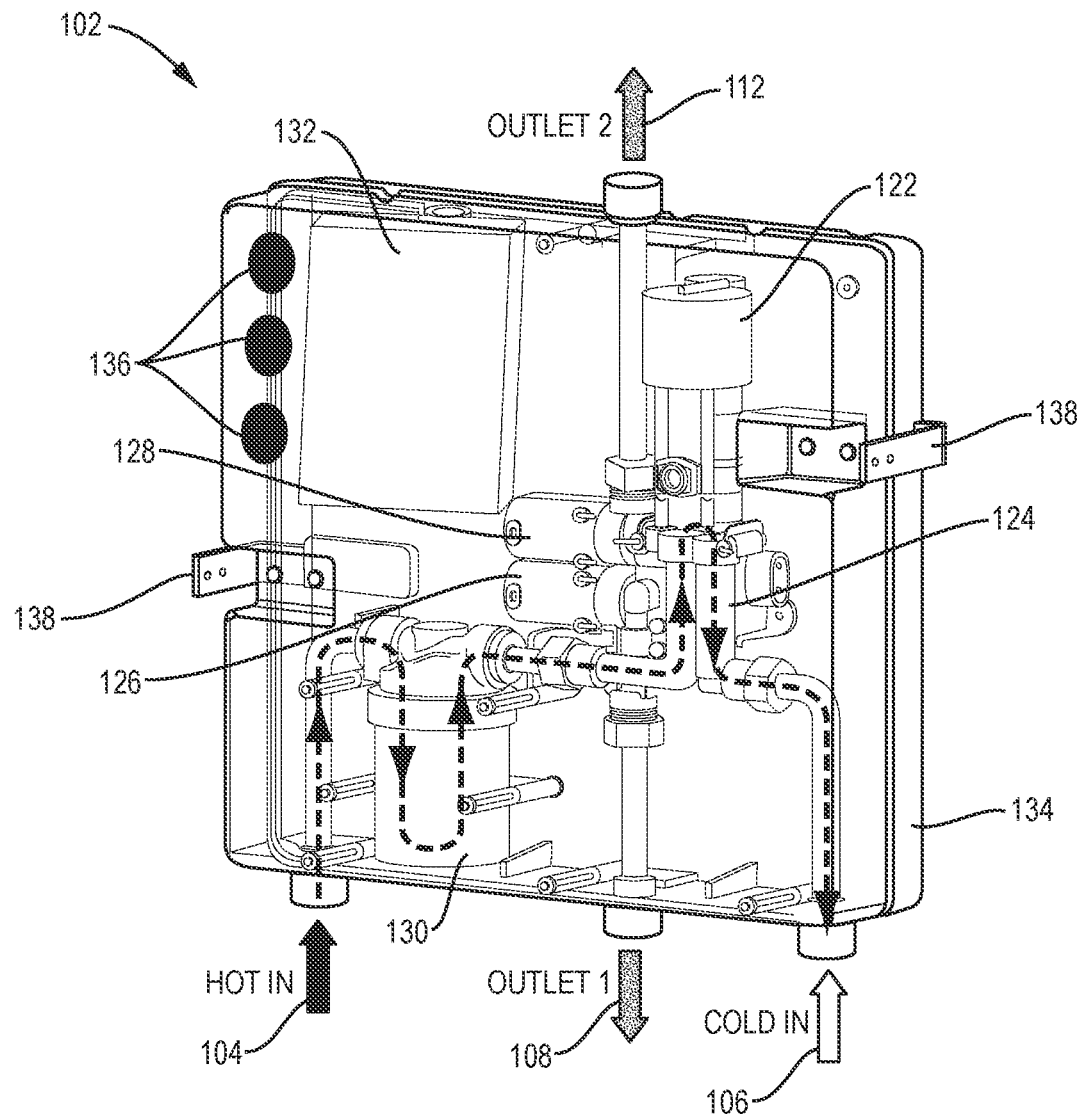
FIGS. 2A and 2B show a recirculation system for use with a shower system in accordance with an embodiment of the present invention.
Figure 2B:
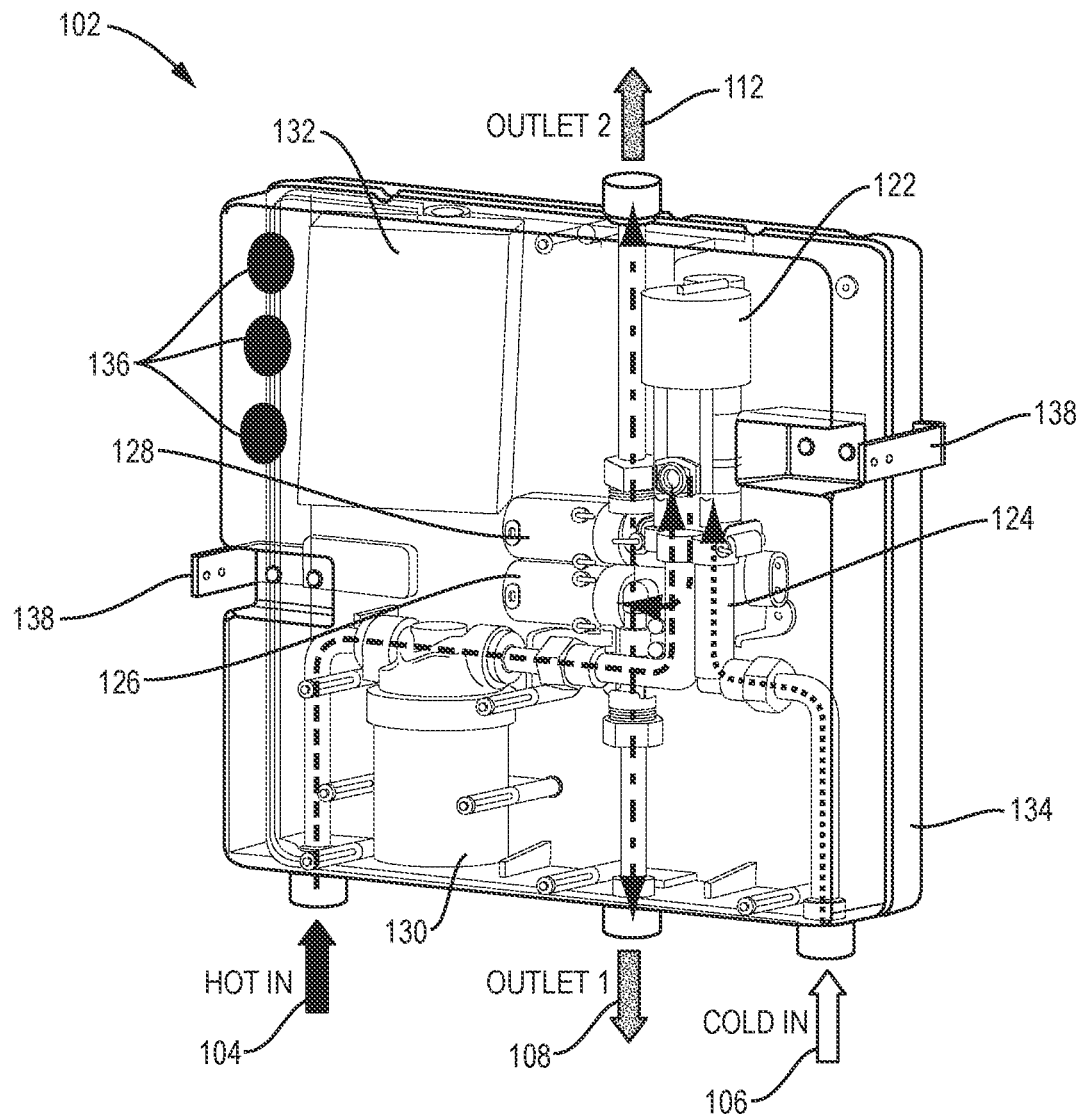

Referring now to FIGS. 2A and 2B, further aspects of recirculation system 102 in accordance with certain embodiments of the present invention will now be described. In some embodiments, recirculation system 102 includes a mixing valve 122 which is arranged and configured to receive and mix water from hot water supply line 104 and cold water supply line 106. In certain embodiments, mixing valve 122 may be connected with water supply lines 104, 106 via a manifold 124 which is in fluid communication with water supply lines 104, 106. Manifold 124 may further be in fluid communication with the one or more outlets 108, 112 such that water leaving mixing valve 122 may be channeled through manifold 124 to one or more of outlets 108, 112 for delivery to the shower enclosure through one or more fixtures (e.g., handheld showerhead 110 and/or fixed showerhead 114).

In some embodiments, one or more valves shutoff valves may be provided for opening or closing certain fluid pathways through manifold 124. In some embodiments, recirculation system 102 may include a separate shutoff valve for each outlet that is provided. The one or more shutoff valves may be, for example, solenoid valves or other electromechanically operated valves. As shown in the illustrated embodiment, recirculation system 102 includes a first shutoff valve 126 which is arranged to open or close the fluid pathway from manifold 124 to first outlet 108, and a second shutoff valve 128 which is arranged to open or close the fluid pathway from manifold 124 to second outlet 112. In this example, when both of first shutoff valve 126 and second shutoff valve 128 are in a closed configuration, water is prevented from exiting recirculation system 102 through either first outlet 108 or second outlet 112. This in turn prevents water from being delivered and sprayed into the shower enclosure, for example, when the water has not reached a desired temperature set by the user. When first shutoff valve 126 is in an open configuration, water is allowed to flow from mixing valve 122 through manifold 124 and through first outlet 108 to be sprayed, for example, via handheld showerhead 110. When second shutoff valve 128 is in an open configuration, water is allowed to flow from mixing valve 122 through manifold 124 and through second outlet 112 to be sprayed, for example, via fixed showerhead 114. As will be explained further herein, in some embodiments, a user may be able to select a particular fixture to deliver water into the shower system through user interface 120. Upon selection of the particular fixture (e.g., via user interface 120), the shutoff valve corresponding to the outlet which is connected to the fixture will be opened to allow water flow while the remaining shutoff valve(s) corresponding to the other outlet(s) will be closed to prevent water flow through the other outlet(s). In this manner, water will only be channeled to the fixtures selected by the user.

In further embodiments, recirculation system 102 includes a recirculation pump 130. In some embodiments, recirculation pump 130 is arranged to be in fluid communication with at least one of the water supply lines 104, 106. In some embodiments, recirculation pump 130 is arranged in fluid communication with hot water supply line 104. In some embodiments, recirculation pump 130 is disposed in a fluid pathway between hot water supply line 104 and manifold 124. In some embodiments, recirculation pump 130 is configured to pump water from hot water supply line 104 to manifold 124. Recirculation pump 130, in certain embodiments, is particularly configured to pump residual cold water from hot water supply line 104. As shown in the pathway designated by the arrows in FIG. 2A, in some embodiments, recirculation pump 130 is configured to pump residual cold water from hot water supply line 104, through manifold 124 and mixing valve 122, and into cold water supply line 106. In some such embodiments, the residual cold water from hot water supply line 104 is allowed to mix with cold water in the cold water supply line 106 instead of being dispensed to the shower enclosure and possibly wasted. In other embodiments, recirculation pump 130 is configured to pump water from hot water supply line 104 back to the water heater which supplies hot water supply line 104, or to another location on hot water supply line 104. Shutoff valves 126, 128 may be closed while recirculation pump 130 is activated to prevent water from flowing out of outlets 108, 112. According to certain embodiments, recirculation pump 130 may be activated during a warm up period of shower system 100 wherein the water is allowed to reach a desired temperature before being delivered to the shower enclosure. Once water inside recirculation system 102 has reached the desired water temperature, recirculation pump 130 may be configured to automatically shut off in some embodiments. The water temperature may be measured by one or more temperature sensors (not shown) included in recirculation system 102. The one or more temperature sensors may be positioned at mixing valve 122, manifold 124, or at other locations along the water pathway within recirculation system 102 which allow the one or more temperature sensors to sufficiently detect the water temperature.

Water pathways through recirculation system 102 after the water has reached the desired temperature according to some embodiments are shown in FIG. 2B. According to these embodiments, recirculation pump 130 is deactivated at this stage and water from hot water supply line 104 and cold water supply line 106 is allowed to flow through manifold 124 and into mixing valve 122. The water from supply lines 104, 106 are combined and mixed at mixing valve 122 and, having reached the desired temperature, is ready for delivery to the shower enclosure for use by the user. In certain embodiments, once the desired water temperature has been reached, one or more of shutoff valves 126, 128 may be opened to allow water from mixing valve 122 to be channeled through manifold 124 and outputted from recirculation system 102 through first outlet 108 and/or second outlet 112. In some embodiments, shutoff valves 126, 128 may be opened only upon activation by the user (e.g., via user interface 120), for example, when the user is ready to shower. In some embodiments, shutoff valves 126, 128 may remain in closed configurations until activated by the user to prevent water from being delivered through outlets 108, 112 and into the shower enclosure. According to some such embodiments, shutoff valves 126, 128 remain closed to prevent water from being delivered into the shower enclosure until the user is ready to shower which can reduce the amount of water that is wasted.

Aspects of recirculation system 102 may be operated by a controller 132. Controller 132 may include suitable electronic components for activating or deactivating mixing valve 122, shutoff valves 126, 128, and recirculation pump 130. For example, controller 132 may include control circuitry, one or more central processing units (CPUs), memory, and other components arranged and configured to provide control signals to elements of recirculation system 102. In some embodiments, the one or more CPUs within controller 132 are configured to receive temperature signals from the one or more temperature sensors. In further embodiments, controller 132 is configured to send and receive signals to and from user interface 120. In some embodiments, controller 132 is configured to receive on/off signals from user interface 120 to turn shower system 100 on or off. In some embodiments, controller 132 is configured to receive a desired temperature signal from user interface 120 which is indicative of a desired water temperature selected by the user. In some embodiments, controller 132 is configured to receive a fixture selection signal from user interface 120 which is indicative of the delivery fixture that the user wishes to use (e.g., handheld showerhead 110 or fixed showerhead 114). Controller 132 may activate or deactivate one or more components of recirculation system 102 in response to a signal received from user interface 120. For example, controller 132 may activate mixing valve 122 when an "on" signal is received, or deactivate mixing valve 122 when an "off" signal is received. In some embodiments, the one or more CPUs of controller 132 are configured to compare the user-selected desired temperature signal and the temperature signals from the one or more temperature sensors to determine if the water temperature has reached the desired temperature or is substantially above or below the desired temperature. In some embodiments, upon receiving a desired temperature signal from user interface 120, controller 132 may activate recirculation pump 130 if the sensed water temperature is lower than the desired temperature selected by the user. In some embodiments, controller 132 may activate recirculation pump 130 if the sensed water temperature is lower than the desired temperature selected by the user by at least a predetermined amount (e.g., lower by at least 1 degree F., at least 2 degrees F., at least 3 degrees F., at least 4 degrees F., at least 5 degrees F., etc.). Controller 132 may also be configured to close shutoff valves 126, 128 while recirculation pump 130 is activated. Once the desired water temperature is reached, controller 132 may deactivate recirculation pump 130. In some embodiments, controller 132 may be configured to open first shutoff valve 126 to allow water to flow through first outlet 108 in response to controller 132 receiving a first fixture selection signal or open second shutoff valve 128 to allow water to flow through second outlet 112 in response to controller 132 receiving a second fixture selection signal. In some embodiments, controller 132 maintains shutoff valves 126, 128 in closed configurations until the water temperature has reached the desired water temperature and a fixture selection signal has been received from user interface 120. In further embodiments, controller 132 may be configured to close shutoff valves 126, 128 if an error condition occurs to prevent water from being delivered to the shower enclosure from recirculation system 102. In some embodiments, controller 132 may be configured to close shutoff valves 126, 128 if, for example, the sensed water temperature exceeds a predetermined value in order to prevent scalding. The predetermined value may be independently selected, for example, from 120 degrees F. to 190 degrees F., e.g., 120 degrees F., 125 degrees F., 130 degrees F., 135 degrees F., 140 degrees F., 145 degrees F., 150 degrees F., 155 degrees F., 160 degrees F., 165 degrees F., 170 degrees F., 175 degrees F., 180 degrees F., 185 degrees F. or greater.

In some embodiments, components of recirculation system 102 may be mounted on and/or contained in a housing 134 which at least partially surrounds the components of recirculation system 102. In some embodiments, housing 134 is configured to be positioned in or behind a wall of the shower enclosure (e.g., wall 116). In some embodiments, housing 134 is sized to fit between studs behind the wall. In some embodiments, housing 134 includes one or more mounting brackets 138 which are configured to receive one or more fasteners (e.g., screws) for mounting and securing housing 134 in or behind the wall (e.g., to the studs behind the wall). In some embodiments, housing 134 completely encloses the components or recirculation system 102. In some embodiments, housing 134 includes openings or ports to accommodate water supply lines 104, 106 and outlets 108, 112. In further embodiments, housing 134 includes one or more electrical ports 136 to allow for electrical connections to or from controller 132 and/or the other components of recirculation system 102. In some embodiments, an external power source (e.g., a building power supply line, backup battery, etc.) may electrically connect to controller 132 through one of the one or more electrical ports 136 to supply power to controller 132 and/or the other components of recirculation system 102. In further embodiments, electrical connection 118 may connect user interface 120 with controller 132 through one or more of the electrical ports 136 to allow for communication between user interface 120 and controller 132. In some embodiments, power may be supplied to user interface 120 via the one or more electrical ports 136. It should be appreciated that the components of recirculation system 102 may be electrically connected to each other with the appropriate wiring, which is not specifically illustrated in the figures for the sake of simplicity and clarity. In other embodiments, user interface 120 may include a separate battery or power source and does not have or require power to be supplied via a wired connection to recirculation system 102. In some embodiments, user interface 120 may be configured to transmit/receive signals to and from controller 132 wirelessly via, for example, WI-FI, Bluetooth, etc. In some such embodiments, each of user interface 120 and controller 132 may include one or more wireless communication modules configured for such purpose. In some embodiments, where wireless communication can be utilized, a physical wired connection (e.g., electrical connection 118) between user interface 120 and controller 132 may therefore be omitted.

In some embodiments, controller 132 is configured to send one or more signals to user interface 120, for example, signals which are indicative of a status of shower system 100. In some embodiments, controller 132 is configured to send a signal to user interface 120 when recirculating pump 130 is activated (e.g., when the water is warming to the desired temperature). In some embodiments, controller 132 is configured to send a signal to user interface 120 when the water in recirculation system 102 has reached the desired temperature and is ready for use in showering. In further embodiments, controller 132 is configured to send a signal to user interface 120 when one or more error conditions are detected. In some embodiments, controller 132 is configured to send a signal to user interface 120 when the sensed water temperature exceeds a predetermined value. In response to receiving a status signal from controller 132, user interface 120 in some embodiments is configured to activate one or more visual and/or audio indicators. For example, in some embodiments, user interface 120 may have one or more lights (e.g., LED lights) which illuminate in different patterns and/or colors depending on the status signal received from controller 132. In some embodiments, the user interface 120 includes one or more lights showing different behaviors that are matched to the movement of water through recirculation system 102 as will be described further herein. In some embodiments, user interface 120 may provide one or more sounds (e.g., a chime, beep, musical tune, recorded or voice message, etc.) depending on the status signal received from controller 132. For example, in some embodiments, user interface 120 is configured to provide different visual and/or audio signals when the water is warming up to the desired temperature, when the water has reached the desired temperature, and when an error condition occurs. User interface 120, in some embodiments, may also include one or more icons or other visual elements (e.g., lights or illuminated icons) to indicate which delivery fixture (e.g., handheld showerhead 110 or fixed showerhead 114) has been selected.

Figure 3:
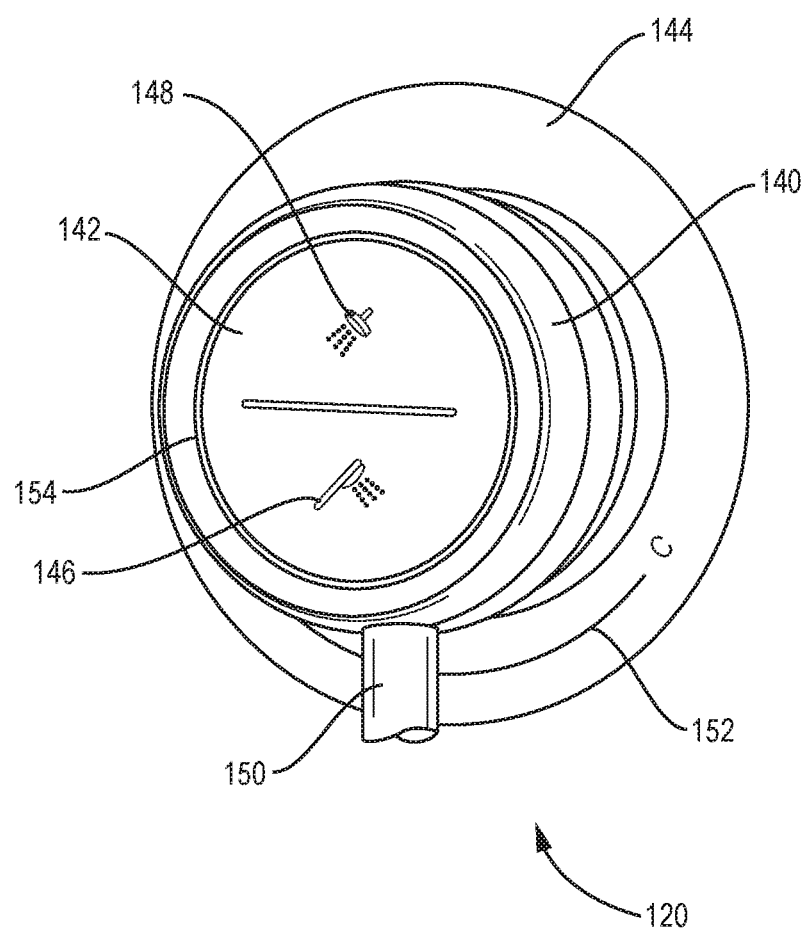
FIG. 3 shows a front perspective view of a user interface for controlling a shower system in accordance with an embodiment of the present invention.
Figure 4A:
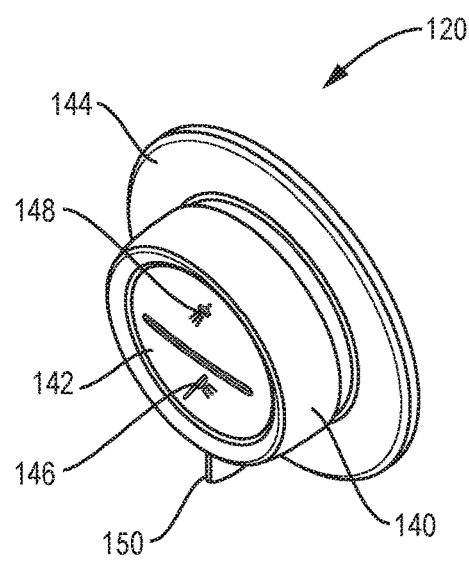
FIG. 4A shows another front perspective view of a user interface for controlling a shower system in accordance with an embodiment of the present invention.
Figure 4B:
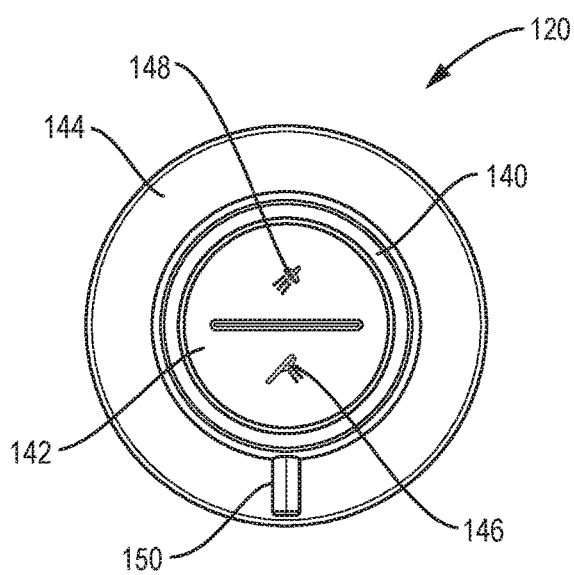
FIG. 4B shows a front elevation view of the user interface of FIG. 4A.
Figure 4C:
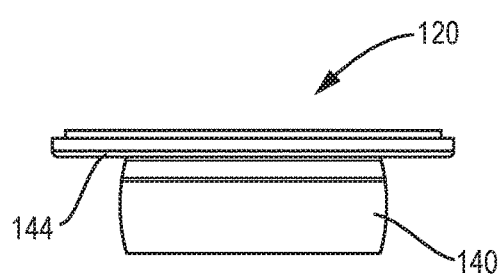
FIG. 4C shows a top plan view of the user interface of FIG. 4A.
Figure 4D:
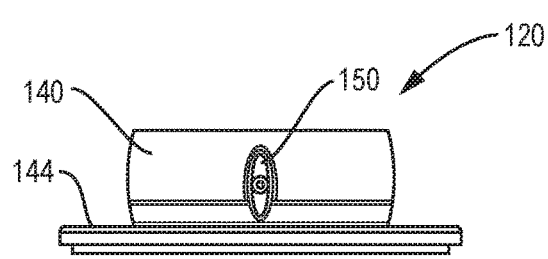
FIG. 4D shows a bottom plan view of the user interface of FIG. 4A.
Figure 4E:
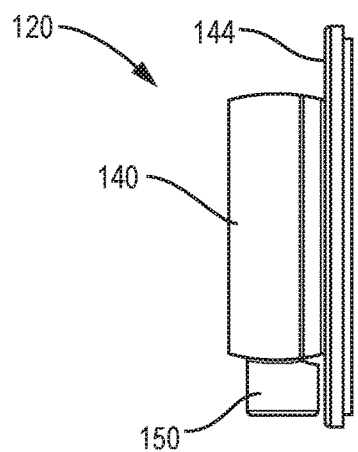
FIG. 4E shows a side elevation view of the user interface of FIG. 4A.
Figure 5A:
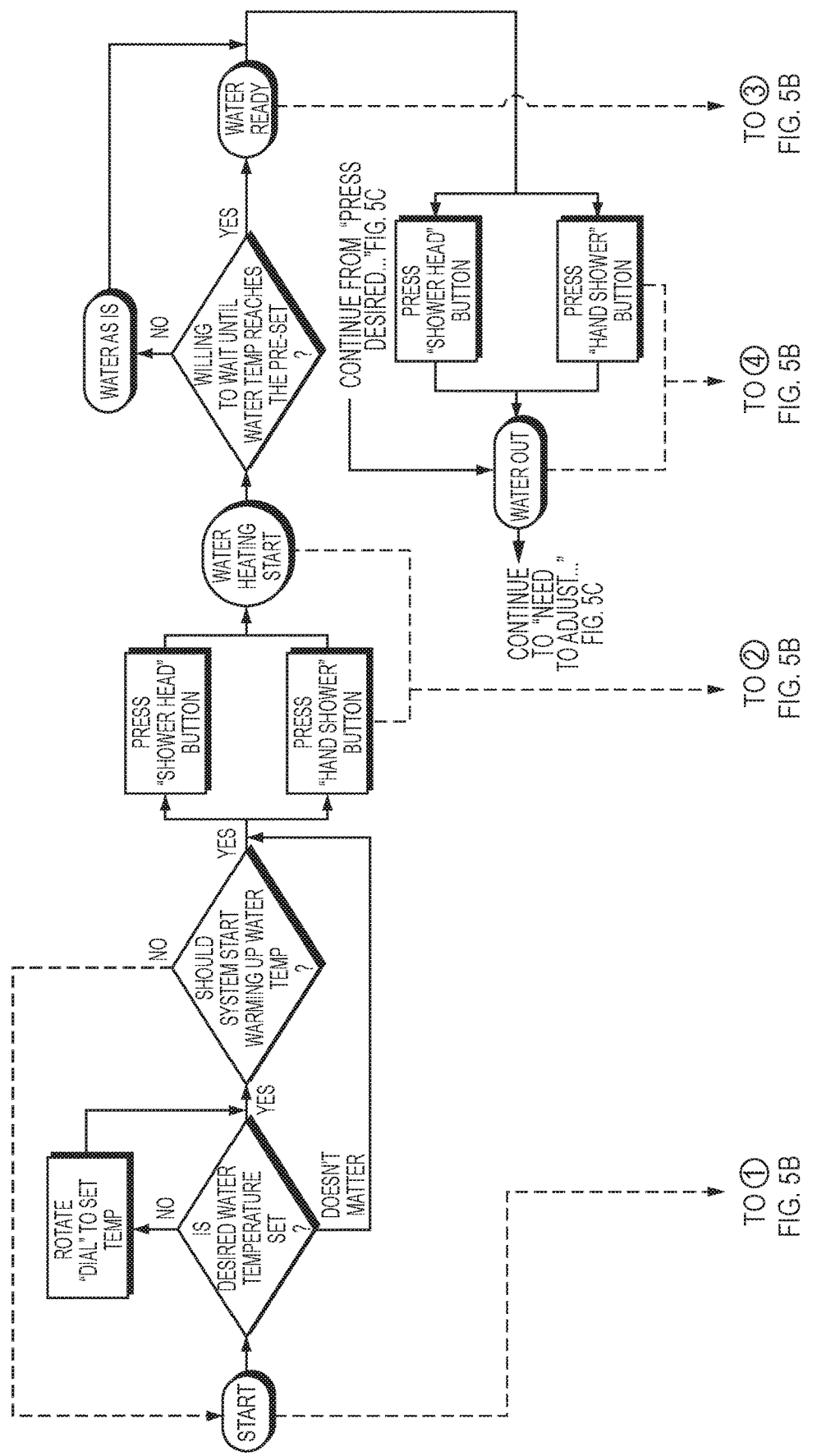
FIGS. 5A-5D show a flow diagram illustrating the operation of a shower system according to an example embodiment of the present invention.
Figure 5B:
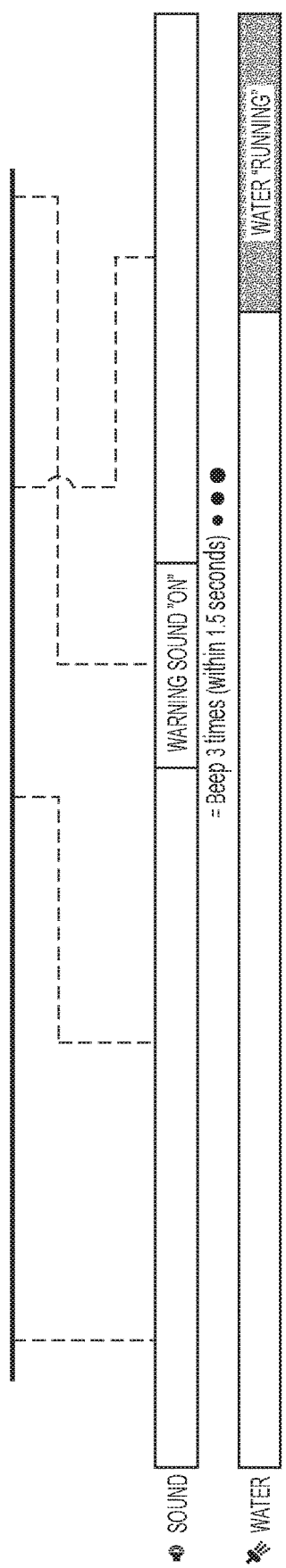
Figure 5B:
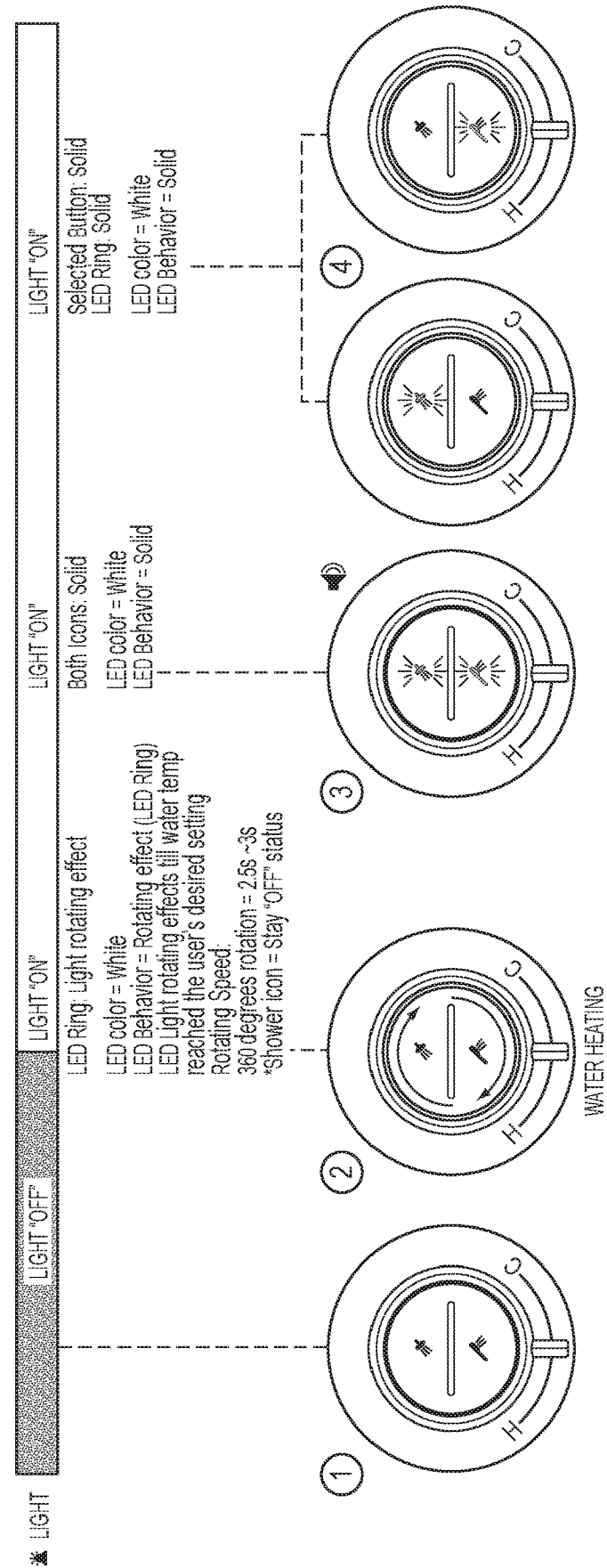
Figure 5C:
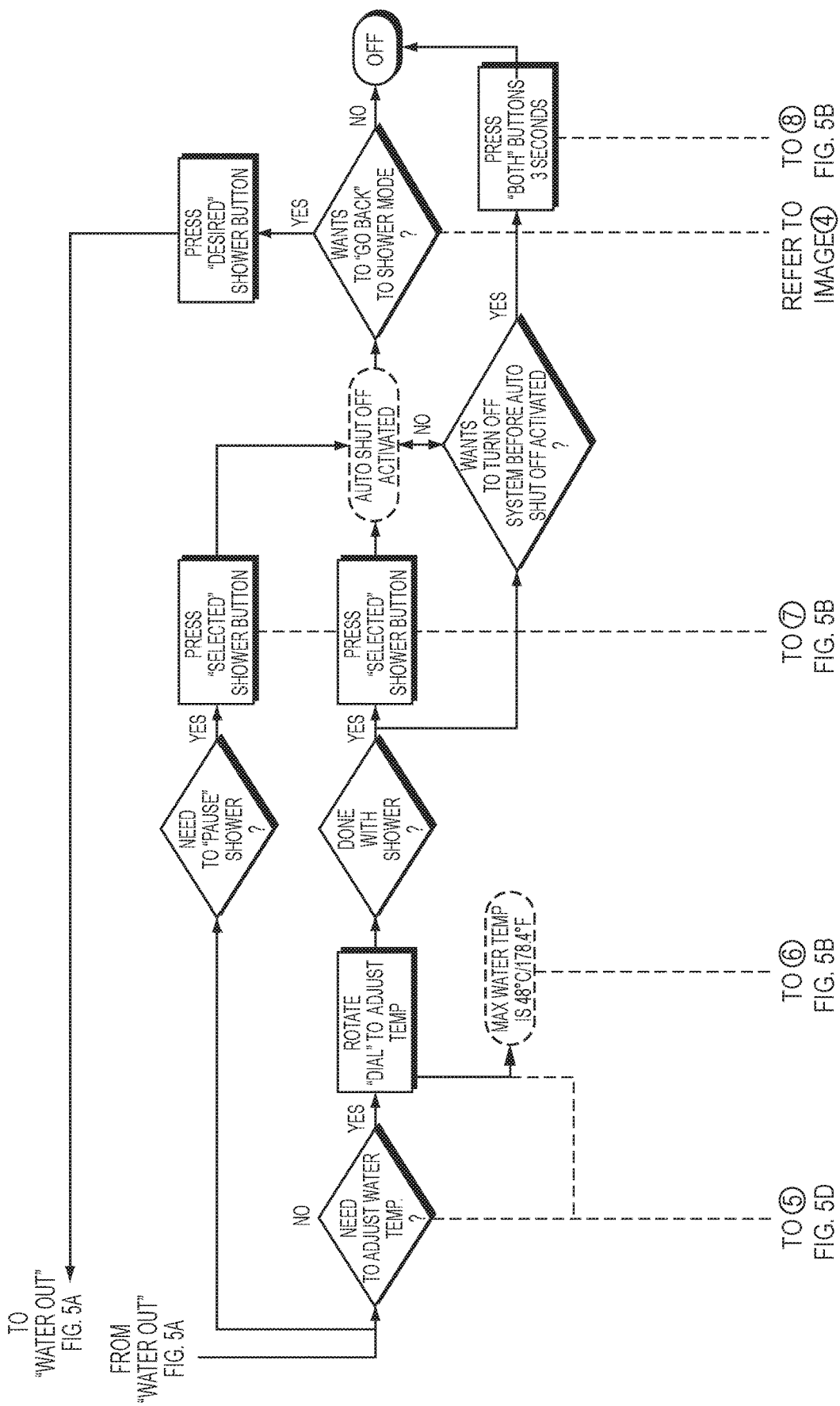
Figure 5D:
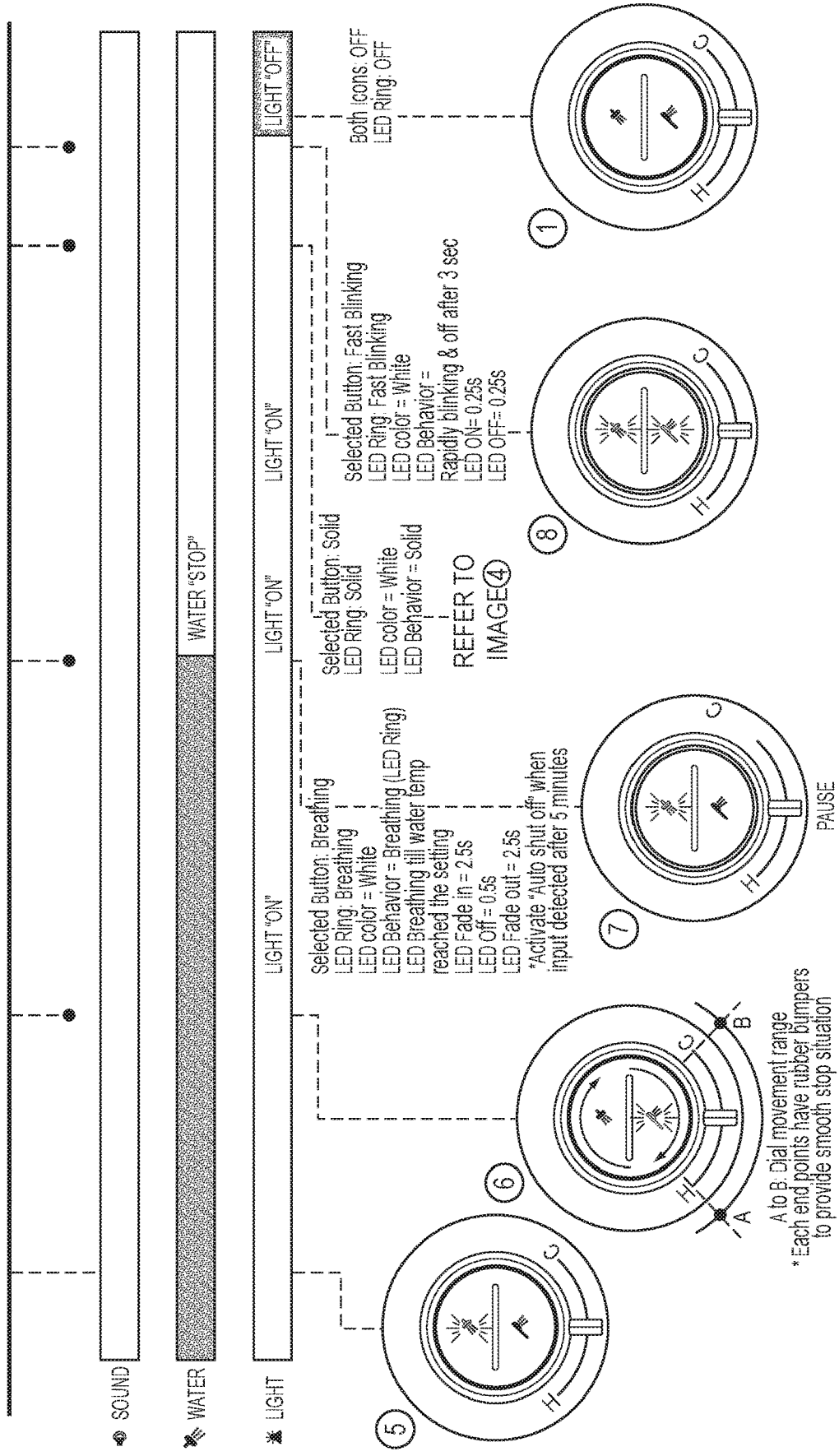

Referring now to FIGS. 3-4E, there is shown an example user interface 120 according to certain embodiments of the present invention. In some embodiments, user interface 120 includes one or more user-actuated controls configured to allow the user to control aspects of shower system 100. As discussed above, in some embodiments user interface 120 may be accessible by a user within shower enclosure (e.g., mounted onto wall 116) and includes at least one temperature control 140 to allow the user to select a desired water temperature. In some embodiments, a touchscreen or other digital interface is provided to allow the user to input the desired water temperature. The temperature control 140, in some embodiments, may be configured as a ring, knob, wheel, dial, or other movable element which is configured to be physically moved by a user (e.g., by the user's hand) to select a desired water temperature. In some embodiments, temperature control 140 includes ring made from a metal or metallic (e.g., stainless steel, titanium, aluminum, etc). Temperature control 140 may have an outer radial surface that is polished (e.g., mirror polished), brush- or satin-finished, or textured, for example, to suit the aesthetic desires of the user. In some embodiments, temperature control 140 is configured to be moved by the user using a first motion or gesture. In some embodiments, the first motion or gesture is a rotational motion. In some embodiments, user interface 120 is configured such that movement of temperature control 140 sends a desired temperature signal from user interface 120 to controller 132 of recirculation system 102 when shower system 100 is activated. For example, in some embodiments, temperature control 140 may be rotated by the user in order to increase or decrease the desired water temperature. In some embodiments, rotating temperature control 140 in a first direction (e.g., clockwise) increases the selected water temperature whereas rotating temperature control 140 is a second, opposite direction (e.g., counterclockwise) decreases the selected water temperature. In the illustrated embodiments, temperature control 140 is configured as a rotatable ring which is configured to surround and rotate about a central core 142. In some embodiments, user interface 120 includes a trim or backing plate 144 onto which central core 142 is mounted. Backing plate 144 in turn may be configured to be mounted onto a wall (e.g., wall 116) of the shower enclosure. In some embodiments, central core 142 is fixed relative to backing plate 144, and temperature control 140 is configured to move (e.g., rotate) with respect to central core 142 and backing plate 144. Backing plate 144 may be, for example, a circular plate as illustrated which is constructed from metal or metallic material, though it should be appreciated that backing plate 144 could have other shapes (e.g, square, rectangular, irregular, etc.) according to other embodiments. Central core 142 may be mounted on or proximate to the center of backing plate 144. As will be described further herein, in some embodiments central core 142 includes additional user-activated controls for controlling aspects of shower system 100.

In some embodiments, temperature control 140 may be configured to rotate about central core 142 within a predetermined angular range. In some embodiments, temperature control 140 is configured to rotate up to an angle that is less than 360°, less than 315°, less than 270°, less than 225°, less than less than 180°, or less than 135° about central core 142. In some embodiments, temperature control 140 is configured to rotate about central core 142 up to an angle independently selected from 45° to 135°, from 60° to 125°, from 75° to 110°, or from 90° to 95° about central core 142. In certain embodiments, user interface 120 includes physical stops (not shown) configured to prevent temperature control 140 from being rotated past its angular range of motion. In some embodiments, the physical stops may include, for example, rubber, silicone, or elastic bumpers positioned at or proximate the end points of the angular range of motion of temperature control 140. In some embodiments, a frictional resistance to the movement of temperature control 140 may be varied such that, for example, the frictional resistance increases as temperature control 140 moves towards the end points of its angular range of motion.

In some embodiments, temperature control 140 includes at least one handle 150 which is rigidly fixed to temperature control 140 and projects radially outward from temperature control 140. In some embodiments, the at least one handle 150 provides a physical portion which the user's hand may contact in order to facilitate rotation of temperature control 140. For example, the user may apply a torque to handle 150 in order rotate temperature control 140 about central core 142. As shown in FIG. 3, in some embodiments, backing plate 144 may include one or more indicia 152 which represent the user-selectable water temperature range. Indicia 152 may include, for example, one or more markings which correlate to specific temperatures. In some embodiments, the one or more indicia 152 are representative of relative water temperature. Indicia 152 may include, for example, an arc which spans the angular range of motion of temperature control 140. A first end of the arc represents the coldest water temperature which may be selected, and a second end of the arc represents the hottest water temperature which may be selected according to some such embodiments. In some embodiments, handle 150 may overlay indicia 152 such that the location of handle 150 over indicia 152 indicates the desired water temperature which has been selected. In some embodiments, an angular position of handle 150 relative to the central core 142 is indicative of the selected water temperature. In some embodiments, temperature control 140 need not be reset by the user each time shower system 100 is used. In some embodiments, a user may set temperature control 140 once by rotating the temperature control 140 to set the desired water temperature and leaving temperature control 140 at that position until the user desires to change the water temperature again.

With particular reference now to FIGS. 3-4B, in some embodiments user interface 120 includes other user-activated controls which may be disposed on central core 142 as mentioned above. In some embodiments, central core 142 includes one or more fixture controls to allow the user to select which delivery fixture of shower system 100 is used to delivery water into the shower enclosure. In some embodiments, activation of the one or more fixture controls sends an electric signal to controller 132 (e.g., to one or more CPUs in controller 132), which in turn controls the opening/closing of shutoff valves 126, 128 in response to direct water to first outlet 108 and/or second outlet 112 during use. The signal may be transmitted to controller 132 via a wired connection, in some embodiments, or wirelessly according to other embodiments. In some embodiments, central core 142 includes one or at least one fixture control for each different delivery fixture in shower system 100. In some embodiments, the one or more fixture controls are configured to be actuated by the user using a motion or gesture that is different from the motion or gesture used to actuate temperature control 140. In some embodiments, each of the one or more fixture controls may be configured as a button (e.g., a push botton) on a face of central core 142. In some such embodiments, each of the one or more fixture controls may be activated by the user by applying an axial or linear force against the button (e.g., a force that is perpendicular or oblique to the face of central core 142). It should be appreciated that the one or more fixture controls may have other arrangements according to other embodiments. For example, a fixture control may be configured as a switch, lever, or a touch screen element.

As shown in the illustrated embodiments, central core 142 includes a first fixture control 146 and a second fixture control 148. For example, first fixture control 146 may be configured to allow a user to select handheld showerhead 110 and second fixture control 148 may be configured to allow a user to select fixed showerhead 114. In some such embodiments, after the water has reached the desired water temperature in recirculation system 102 during use, user activation of first fixture control 146 may cause controller 132 to open first shutoff valve 126 of recirculation system 102 to allow water to flow through first outlet 108 for delivery into the shower enclosure via handheld showerhead 110. Activation of second fixture control 146 may cause controller 132 to open second shutoff valve 128 of recirculation system 102 to allow water to flow through second outlet 112 for delivery into the shower enclosure via fixed showerhead 114. In some embodiments, activation of first fixture control 146 may automatically deactivate second fixture control 148 and cause second shutoff valve 128 to close, and activation of second fixture control 148 may automatically deactivate first fixture control 146 and cause first shutoff valve 126 to close. In other embodiments, both of first fixture control 146 and second fixture control 148 may be activated simultaneously to allow water to be delivered via both handheld showerhead 110 and fixed showerhead 114. In some embodiments, first and second fixture controls 146, 148 may each include a graphical icon which represents the delivery fixture which is activated by the respective fixture control. In some embodiments, the graphical icon on a fixture control may be configured to illuminate (e.g. via an LED or other light source housed in central core 142) when a user has actuated that fixture control during use. In some embodiments, the graphical icons may be configured to illuminate during different statuses of shower system 100. In alternative embodiments (not shown), separate indicator lights may be included on the fixture controls, or the fixture controls may include text labels instead of or in addition to the graphical icons.

In further embodiments, user interface 120 may also include one or more status indicators. The one or more status indicators may be configured, for example, to provide the user with a visual and/or audio indication of the status (e.g., operational mode) of shower system 100. In some embodiments, the one or more status indicators are configured to exhibit different behaviors during different stages of operation of shower system 100 and/or recirculation system 102. In some embodiments, the one or more status indicators exhibit different behaviors which are, for example, timed to match to flow of water through shower system 100 and/or recirculation system 102. In the illustrated embodiments, user interface 120 includes a status indicator light 154 which may be configured as a circular ring along the periphery of the face of central core 142. In some embodiments, status indicator light 154 is positioned on or within temperature control 140. In other embodiments, status indicator light 154 may be positioned on trim or backing plate 144.

In some embodiments, status indicator light 154 is configured to illuminate to provide a visual indicator to the user of the status of shower system 100. In some embodiments, status indicator light 154 has different behaviors that are timed to match the flow of water within recirculation system 102 and/or shower system 100. In some embodiments, status indicator light 154 has different behaviors that are timed to match the different operational stages of recirculation system 102 and/or shower system 100 (e.g., during warm up of the water, when the water has reached the desired temperature and is ready for use by the user, when the water is being outputted into the shower enclosure by the one or more delivery fixtures, etc.). In some embodiments, status indicator light 154 is illuminated by one or more LEDs or other light sources housed in central core 142. In some embodiments, status indicator light 154 is configured to illuminate in different patterns and/or colors depending the status of shower system 100. User interface 120 may receive signals from controller 132 during different stages of operation which dictate the different patterns and/or colors presented by status indicator light 154. For example, status indicator light 154 may include a plurality of LEDs which turn on/off in one or more predefined patterns in response to signals received from controller 132. In some embodiments, status indicator light 154 is configured to provide, for example, a rotating or swirling light pattern when water is being warmed to the desired water temperature. In some such embodiments, status indicator light 154 provides a rotating or swirling light pattern when recirculation pump 130 is activated and water (e.g., from hot water supply 104) is being pumped by recirculation pump 130. Such a rotating or swirling pattern may indicate to the user that the water is being warmed up to the desired temperature by the recirculation system 102 and not yet ready for use in showering, for example. In some embodiments, for example, status indicator light 154 may give the appearance of a light moving in a circle about the face of central core 142 (e.g., at one revolution per 2.5 to 3 seconds). In some embodiments, status indicator light 154 is configured to repeatedly fade on and off, for example, when the water has reach the desired water temperature and is ready for use. This may occur, for example, when or after controller 132 receives signals from one or more temperature sensors which indicate that the water within recirculation system 102 has reached the desired temperature set by temperature control 140 and recirculation pump 130 is deactivated, but before shutoff valves 126, 128 have been opened such that water is not flowing through first and second outlets 108, 112. In some embodiments, status indicator light 154 may also be configured to repeatedly fade on and off when, for example, shower system 100 is in a paused condition such that water is not being delivered into the shower enclosure (e.g., shutoff valves 126, 128 are closed) but the water is still at the desired temperature. For example, in some embodiments, the status indicator light 154 may give the appearance of a ring of light that repeats a cycle of: fade off (decreases light intensity) over a period of 2-3 seconds, stays off for less than one second, and fade back on (increases light intensity) over a period of 2-3 seconds. In some embodiments, status indicator light 154 is configured to be constantly and solidly lit (e.g., show a solid ring of light) when, for example, water is being delivered through the one or more delivery fixtures (e.g., during showering). In some embodiments, for example, status indicator light 154 is configured to switch to a constant and solid light when one or more of shutoff valves 126, 128 are opened and water is flowing through first outlet 108 and/or second outlet 112 to one or more delivery fixtures (e.g., handheld showerhead 110 or fixed showerhead 114). In some embodiments, status indicator light 154 is configured to rapidly blink or flash when, for example, shower system 100 is about to shut down (enter an "off" mode) or an error condition has been reached. Water may not be flowing into the shower enclosure during this time (e.g., shutoff valves 126, 128 are closed). For example, status indicator light may be configured to turn on for less than one second (e.g., 0.1-0.5 seconds) and turn off for less than one second (e.g., 0.1-0.5 seconds) repeatedly. In some embodiments, when shower system 100 is in an "off" mode, status indicator light 154 is not illuminated.

In further embodiments, status indicator light 154 is configured to change color depending on the status of shower system 100. In some embodiments, status indicator light 154 is configured to change color in response to the sensed water temperature of shower system 100. For example, status indicator light 154 may have a first color (e.g., white) when the water is at the user-selected desired water temperature, and a second color (e.g., light blue) when the water is lower than the desired water temperature. In some embodiments, status indicator light 154 may change to a third color (e.g., deep blue) if there is insufficient hot water to reach the desired temperature. In some embodiments, status indicator light may change to a fourth color (e.g., red) if the water temperature is above the desired temperature. The color changes may occur with the changes in light patterns described above. For example, in some embodiments, when the water is warming to the desired temperature, status indicator light 154 may show a light blue light in a rotating or swirling pattern, and when the water has reached the desired temperature and is ready for use, the status indicator light may change to show a white ring of light that fades on and off. In yet further embodiments, user interface 120 may be configured to provide one or more audio signals (e.g., beep, chime, voice message, etc.). For example, user interface 120 may be configured to provide an audio signal, for example, when the water has reached the desired water temperature and is ready for use, upon the occurrence of an error condition (e.g., water is too hot), when the user selects one of the fixture controls (e.g., fixture controls 146, 148), and/or when shower system 100 is being turned on/off. The operation of shower system 100, the illumination of status indicator light 154, the use of fixture controls 146, 148, and the activation of the one or more audio signals according to certain example embodiments is illustrated in the flow chart FIGS. 5A-5D.

User interface 120 may include electrical circuitry (not shown) which is configured for transmitting signals to and/or receiving signals from controller 132, for converting user-actuation of temperature control 140 and/or fixture controls 146, 148 into electrical signals, and/or for activating the one or more status indicators (e.g., status indicator light 154). The electrical circuitry may be housed in central core 142, for example. In some embodiments, user interface 120 includes one or more ports for receiving and connecting to electrical connection 118 to allow for the transmission of power and/or data between user interface 120 and controller 132. In some embodiments, the one or more ports may be positioned on a rear surface or portion of central core 142 which is opposite the exposed face containing the fixture controls 146, 148 and/or status indicator light 154. In some embodiments, the rear surface or portion of central core 142 may be configured to face toward shower wall 116 when user interface 120 is mounted onto the shower wall 116.

Figure 6A:
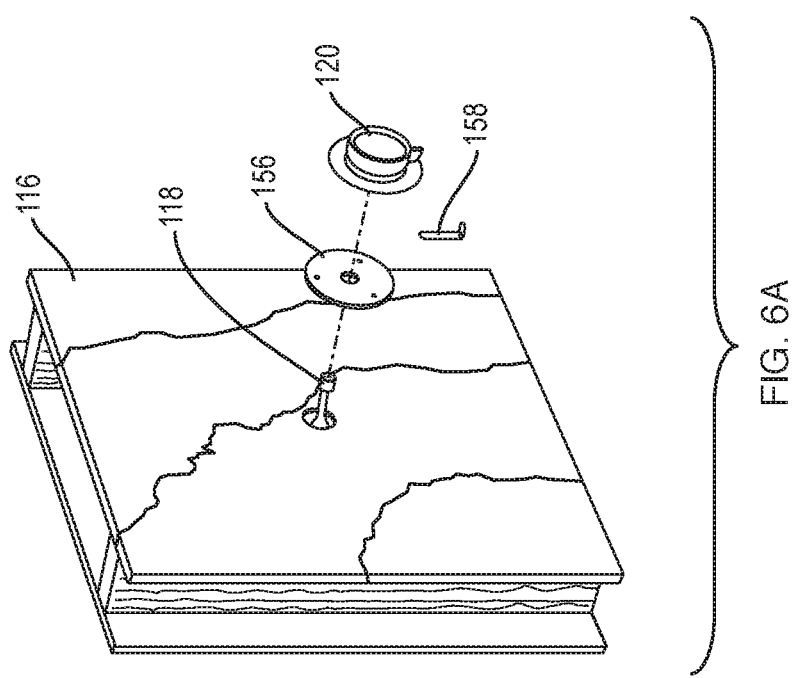
FIG. 6A shows a partial exploded view of a user interface relative to a shower wall in accordance with an embodiment of the present invention.
Figure 6B:
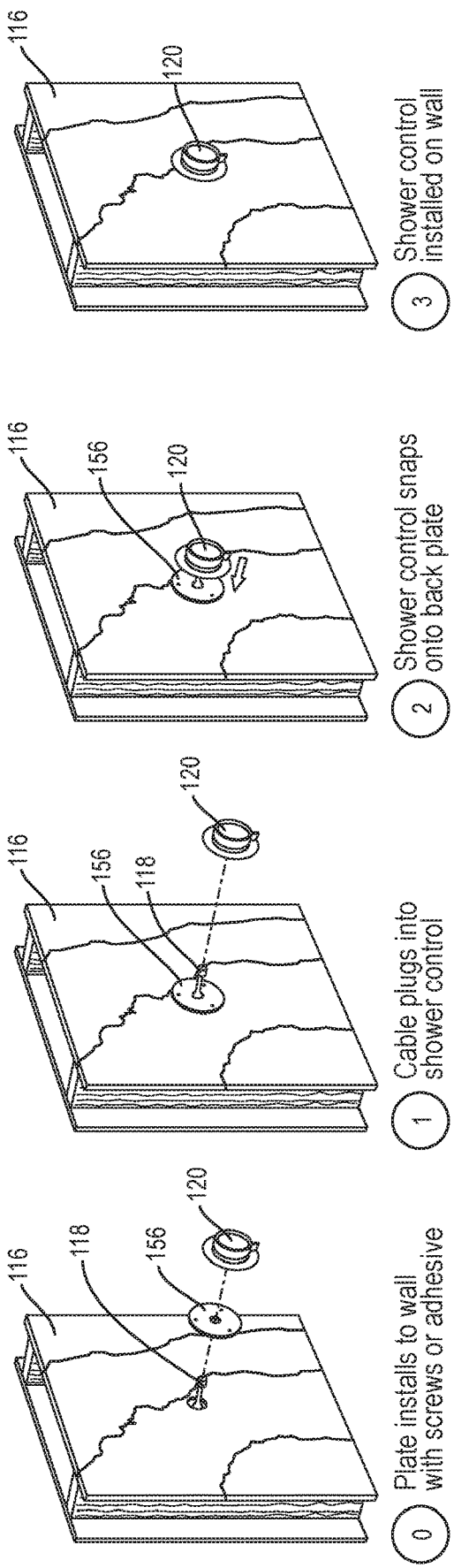
FIG. 6B shows steps for installing the user interface of FIG. 6A onto the shower wall in accordance with an embodiment of the present invention.
Figure 6C:
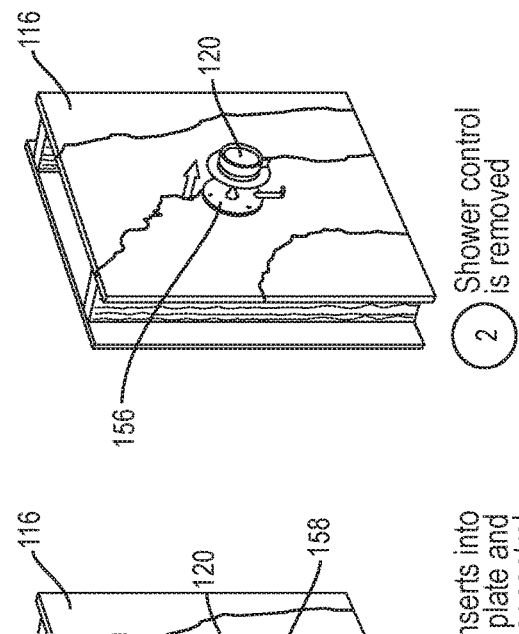
FIG. 6C shows steps for removing the user interface of FIG. 6A from the shower wall in accordance with an embodiment of the present invention.
Figure 6C:
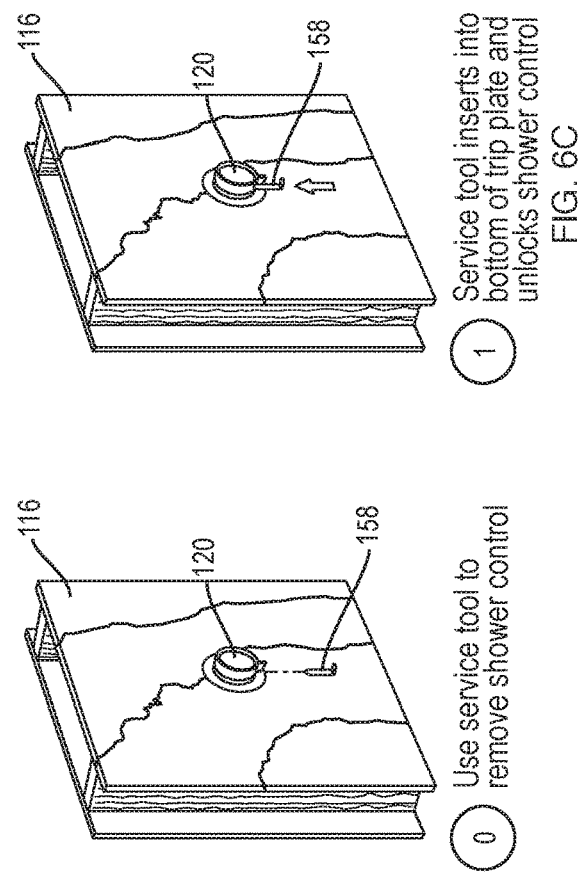

FIGS. 6A-6C illustrate the mounting/dismounting of user interface 120 onto a shower wall 116 according to an example embodiment. As particularly shown in FIGS. 6A and 6B, an end of electrical connection 118 may extend through a hole in wall 116. As described previously herein, electrical connection 118 may include, for example, power/data transmission cables which are connected to recirculation system 102 positioned within or behind wall 116. A mounting plate 156 may be positioned onto wall 116 around electrical connection 118 and be fixedly secured to wall 116 using one or more mechanical fasteners (e.g., screws, nails, tacks, bolts, pins, etc.) and/or adhesive. Mounting plate 156 may include, in some embodiments, an opening which is sized and configured to allow electrical connection 118 to pass through mounting plate 156. The end of electrical connection 118 may then be connected to user interface 120 through a back portion of user interface 120. For example, a back portion of central core 142 may include one or more ports for receiving and electrically connecting to an end of electrical connection 118. In some embodiments, after user interface 120 has been connected to electrical connection 118, user interface 120 may be secured to mounting plate 156 to mount user interface 120 onto wall 116. In some embodiments, user interface 120 may be secured to mounting plate 156 via a snap fit. In some such embodiments, backing plate 144 of user interface 120 is configured to form a snap fit connection onto mounting plate 156. In some embodiments, user interface 120 is secured to mounting plate 156 via a reversible coupling. In some embodiments, a separate service tool 158 is required to uncouple user interface 120 from mounting plate 156, for example, as shown in FIG. 6C. In some embodiments, user interface 120 is configured to unlock from mounting plate 156 upon insertion of the separate service tool 158. Service tool 158 may be received in an opening formed at a bottom portion of user interface 120 (e.g., a bottom portion of backing plate 144 or handle 150) and/or between mounting plate 156 and backing plate 144 to dismount user interface 120 from mounting plate 156 according to some embodiments. Once user interface 120 is dismounted from mounting plate 156, user interface 120 may be pulled away from wall 116.

In some embodiments, as previously mentioned, components of a shower system according to the present invention may be configured to wirelessly connected to each other. For example, in some embodiments, user interface 120 need not have a physical wired connection (e.g., electrical connection 118) to recirculation system 102 or controller 132. In some such embodiments, user interface 120 may be configured to communicate wirelessly with controller 132 and/or other components of recirculation system 102. In some embodiments, user interface 120 may have one or more wireless communication modules (e.g., housed within central core 142 or backing plate 144) configured to receive and/or transmit signals via, for example, radio or other wireless technologies (WI-FI, Bluetooth, etc.). In further embodiments, user interface 120 includes a separate power source than recirculation system 102 for powering the components of user interface 120. For example, in some embodiments, user interface 120 includes a separate battery (e.g., one or more alkaline batteries, lithium-ion batteries, rechargeable batteries etc.). The battery may be housed, for example, within central core 142 and/or backing plate 144. In further embodiments, user interface 120 may include an indicator which is indicative of the remaining power or life of the one or more batteries. In some embodiments, electrical connection 118 may be omitted and the back portion of central core 142 need not include one or more ports for receiving electrical connection 118 where user interface 120 is configured to communicate wirelessly with recirculation system 102. In some embodiments, without the need for a physical wired connection, user interface 120 may be moved to any desired location by the user so long as the user interface 120 is within wireless communication range with controller 132. In some embodiments, for example, mounting plate 156 may not be necessary, and user interface 120 may instead be removably secured to different locations by the user via adhesives, mechanical fasteners (e.g., hook-and-loop fasteners), one or more magnets, or other attachment means. In still other embodiments, user interface 120 may be configured to be a handheld device.

It should be understood that various changes, substitutions, and alterations can be made herein without departing from the spirit and scope of the invention as defined by the appended claims. It should also be apparent that individual elements identified herein as belonging to a particular embodiment may be included in other embodiments of the invention. Moreover, the scope of the present application is not intended to be limited to the particular embodiments of the process, machine, manufacture, and composition of matter, means, methods and steps described in the specification. As one of ordinary skill in the art will readily appreciate from the disclosure herein, processes, machines, manufacture, composition of matter, means, methods, or steps that perform substantially the same function or achieve substantially the same result as the corresponding embodiments described herein may be utilized according to the present invention.

What is claimed is:

1. A user interface for controlling a shower system comprising:
   at least one control configured to be actuated by a user and generate one or more signals for controlling an operation of the shower system; and
   at least one indicator light configured to illuminate in different patterns which are matched to different operational stages of the shower system,
   wherein
   the user interface comprises a central core and a temperature control comprising a ring positioned around and rotatable about the central core,
   the at least one indicator light is positioned on a face of the central core,
   the ring comprises a physical handle projecting radially outward therefrom, an angular position of the handle relative to the central core being indicative of a desired water temperature,
   the temperature control is configured to allow a user to set the desired water temperature by applying a torque to the handle to rotate the ring to the angular position relative to the central core,
   the at least one indicator light is configured to provide a first light pattern when the shower system is in a first operational stage wherein water in the shower system is being warmed to the desired temperature, and
   the at least one indicator light is configured to provide a second light pattern different from the first light pattern when the shower system is in a second operational stage wherein a temperature of the water has reached the desired temperature.

2. The user interface of claim 1, wherein the temperature control is configured to be left at the angular position between uses of the shower system to maintain the desired water temperature.

3. The user interface of claim 1, wherein the first light pattern includes a rotating or swirling light pattern, and wherein the second light pattern includes a fading on and off pattern.

4. The user interface of claim 1, wherein the indicator light is configured to provide a third light pattern that is different from the first light pattern and the second light pattern when the shower system is in a third operational stage wherein the water is flowing to a delivery fixture.

5. The user interface of claim 4, wherein the third light pattern includes a constant solid light.

6. The user interface of claim 1, wherein the at least one indicator light is shaped as a circle along a periphery of the face of the central core.

7. The user interface of claim 1, wherein the user interface includes a first fixture control configured to allow a user to activate a first delivery fixture of the shower system.

8. The user interface of claim 7, wherein the user interface includes a second fixture control configured to allow a user to activate a second delivery fixture of the shower system.

9. The user interface of claim 8, wherein the first fixture control and the second fixture control are located on the central core of the user interface.

10. The user interface of claim 9, wherein the first fixture control includes a first graphical icon configured to illuminate when the first delivery fixture is activated, and the second fixture control includes a second graphical icon configured to illuminate when the second delivery fixture is activated.

11. The user interface of claim 1, wherein the central core comprises a back portion opposite the face, the back portion including one or more ports for receiving an electrical cable for transmitting the one or more signals to a controller.

12. The user interface of claim 1, wherein the at least one indicator light is further configured to change colors depending on a sensed water temperature of the shower system.

13. The user interface of claim 1, further comprising one or more wireless communication modules configured to transmit the one or more signals wirelessly to a controller that is remote from the user interface.

14. The user interface of claim 13, wherein the one or more signals include at least one of a temperature control signal and a delivery fixture selection signal.

15. The user interface of claim 13, further comprising one or more batteries housed within the user interface and configured for supplying power to the user interface.

16. A shower system comprising:
a recirculation system comprising:
a first inlet for receiving water from a first water supply;
a second inlet for receiving water from a second water supply;
a mixing valve configured to mix water received from the first water supply and the second water supply to produce a mixed water stream;
a first outlet for communicating the mixed water stream from the mixing valve to a first delivery fixture;
a first shutoff valve having an open configuration and a closed configuration, the mixed water stream being allowed to flow from the mixing valve to the first outlet when the first shutoff valve is in the open configuration and prevented from flowing from the mixing valve to the first outlet when the first shutoff valve is in the closed configuration;
a controller configured to transition the first shutoff valve between the open configuration and the closed configuration, the controller configured to maintain the first shutoff valve in the closed configuration while a sensed water temperature within the recirculation system is lower than a desired water temperature; and
the user interface according to claim 1 in communication with the controller.

* * * * *